United States Patent Office 3,850,969

Patented Nov. 26, 1974

3,850,969

PROCESS FOR THE PREPARATION OF HYDROXY SUBSTITUTED AMINIMIDES

Robert A. Grimm, Lakeville, and Edward A. Sedor, Edina, Minn., assignors to Ashland Oil, Inc., Columbus, Ohio No Drawing. Filed May 28, 1971, Ser. No. 148,164
Int. Cl. C07c *103/12, 103/22, 121/02*
U.S. Cl. 260—404.5 8 Claims

ABSTRACT OF THE DISCLOSURE

A process is disclosed for the preparation of tertiary amine monoimides wherein a dialkyl hydrazide of a mono-carboxylic acid is reacted with a compound containing at least one oxirane oxygen grouping. The hydroxy substituted aminimide obtained in accordance with the disclosed process can be thermally rearranged to provide the corresponding isocyanate having a variety of known uses.

BACKGROUND OF THE INVENTION

Field of the Invention

This invention relates to a process for the preparation of tertiary amine mono-imides.

Description of the Prior Art

Tertiary amine mono-imides, which have been trivially designated mono-aminimides, can be depicted by the general formula $$A-\overset{\ominus}{N}-\overset{\oplus}{N}<$$

wherein A represents an acyl radical. The prior art has proposed two ways of producing such aminimides. A particularly useful method for deriving these compounds can be found exemplified in U.S. Pat. No. 3,485,806. The process disclosed and claimed therein basically consists of reacting a carboxylic acid ester with a compound containing at least one oxirane grouping and an unsymmetrically disubstituted hydrazine. An alternate way of preparing the aminimides in accordance with this prior art process consists of initially reacting the unsymmetrical disubstituted hydrazine with a mono-epoxide to produce the corresponding aminimine, followed by reaction of the latter with the carboxylic acid ester. The resultant hydroxy substituted aminimides exhibit a variety of utilities which have been extensively set forth in U.S. Pat. No. 3,485,806.

The aforedescribed prior art method provides in general an overall excellent route for the preparation of various types of aminimides including the polyaminimides. The process of the present invention can nevertheless be utilized with advantage as an alternate route in the production of mono-aminimides. The principal advantageous feature of the instant invention is that in some instances the practice thereof will result in improved selectivity toward the formation of the contemplated end products.

SUMMARY OF THE INVENTION

In accordance with the present invention, a process is provided for the preparation of tertiary amine mono-imides by the reaction of a hydrazide of a mono-carboxylic acid with a compound containing at least one oxirane oxygen grouping.

The underlying reaction of the process of this invention can be schematically illustrated as follows:

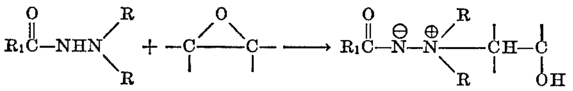

whrein $R_1$ represents alkyl, alkoxy, alkenyl, aryl or cyanoalkyl, and wherein R is alkyl.

DESCRIPTION OF THE PREFERRED EMBODIMENTS

The starting materials from which the mono-aminimides are derived in accordance with the present process are the dialkyl hydrazides of a mono-carboxylic acid. These acyl hydrazines are readily obtained by condensing an unsymmetrical dialkyl substituted hydrazine with the corresponding acid halide, specifically the acid chloride. Representative of the applicable acid chlorides are those of such acids as the fatty acids, the vinyl unsaturated mono-acids, the aromatic and cyclo-aliphatic mono-acids and the various substituted acids of this type. An exemplary enumeration of the acyl hydrazines useful in the practice of the present invention can be found in the working examples presented hereinbelow and which in turn is broadly illustrative of the acid chlorides from whence such hydrazides can be derived.

The compounds having at least one oxirane oxygen grouping useful in deriving the mono-aminimides in accordance with this invention include a wide variety of mono- and polyepoxides. More specifically, the applicable epoxides are those containing at least one of the following grouping:

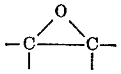

The oxirane oxygen grouping can be internal wherein each carbon atom of the oxirane ring is attached to at least one organic radical or, more preferably, are terminal, wherein at least one carbon atom is attached to two hydrogen atoms. Likewise, the carbon atoms of the oxirane ring can form part of a cycloaliphatic residue, such as exemplified by cyclohexene oxide. These compounds can contain one or more oxirane oxygen groupings as well as containing other groups which do not preferentially react with the hydrazides contemplated herein.

As indicated, the preferred mono-epoxides are those corresponding to the following formula:

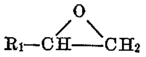

wherein $R_1$ is hydrogen, alkyl, aryl, aralkyl or alkaryl. Illustrative of the preferred compounds are such as ethylene oxide, 1,2-propylene oxide, styrene oxide, glycidol, 1,2-decylene oxid, 1,2-pentadecylene oxid, 1,2-octadecylene oxide and the like. The particularly preferred epoxides corresponding to the above formula are those in which $R_1$ represents a lower alkyl group, especially methyl.

Further examples of suitable epoxides containing a plurality of oxirane oxygen groupings are those corresponding to the following formula:

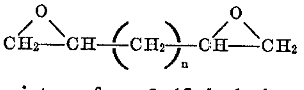

wherein *n* is an integer from 0–12, inclusive.

The hydroxy substituted aminimides are produced in accordance with the process of this invention by reacting approximately stoichiometric amounts of the acyl hydrazine and the epoxide. Due to the volatile nature of a variety of the epoxides useful herein, it is desirable to conduct the reaction in a sealed system. Solvents are not necessary but can be employed. The preferred solvents are the polar organic solvents representative of which include the lower alkanols, dimethyl sulfoxide and the like. The reaction temperature is not critical, however, an applicable range is from about 40° to 80° C. The preferred temperature range is from about 50° to 70° C. Operating in the preferred temperature range will minimize degradation of the intermediates formed during the course of the reaction thus providing optimum yields. The reaction times vary widely depending upon the particular reactants utilized but, in general, the reaction is decidedly time dependent requiring in many instances a number of days to achieve the maximum yield the particular reaction system is capable of affording.

In order to illustrate to those skilled in the art the best mode contemplated for carrying out the present invention, the following working examples are given. As indicated, these examples are given primarily by way of illustration and accordingly any enumeration of details contained therein should not be construed as a limitation on the invention except to the extent expressed in the appended claims. All percentages given are on a weight basis.

EXAMPLE I

In this example, a plurality of acyl hydrazines were reacted with propylene oxide to provide the respective hydroxy substituted aminimide derivative. In each run, approximate stoichiometric proportions were utilized. Likewise, in each preparation, isopropanol as a solvent for the reactants was used. Typically, the reactant solids comprised about 25 to 40% of the reaction mixture. All reactions were conducted in a sealed serum bottle and agitation provided by means of a mechanical shaker. Work-up of the reaction product was accomplished by either recrystallization of the reaction mixture or by means of thin layer chromatography fractionation. The product of each run was identified by comparing the infrared spectrum thereof versus the spectrum for the known compound. Further details regarding the identity of the acyl hydrazines employed in these various runs, together with the reaction time and temperature observed and the conversion yield obtained are set forth in the following Table I.

TABLE I

| Run number | Acyl hydrazine | Reaction time | Reaction temperature, ° C. | Yield of hydroxy aminimide, percent |
|---|---|---|---|---|
| 1 |  | 48 hours | 50 | 50 |
| 2 | Same as above | 96 hours | 50-55 | 83.3 |
| 3 | 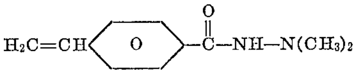 | 12 days | 50 | 50 |
| | 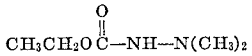 | 5 days | 70 | 60 |
| 5 | 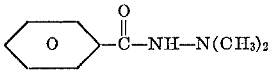 | 6 days | 65 | 12.5 |
| 6 | 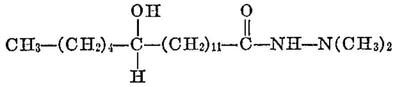 | 11 days | 70 | 90 |
| 7 | 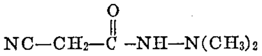 | 32 hours | 70 | 100 |
| 8 | 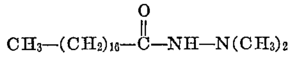 | 11 days | 70 | 90 |

EXAMPLE II

This example primarily illustrates the use of various types of epoxides for reaction with representative acyl hydrazines of those contemplated for obtaining the corresponding hydroxy substituted aminimides. The individual runs of this example were carried out in the manner described in Example I employing the same work-up procedures and identification method employed therein. The reaction temperature was maintained at 70° C. throughout. Further details relative to this series of runs are set forth in the following Table II.

TABLE II

| Run number | Acyl hydrazine | Epoxide | Reaction time, hours | Yield of hydroxy aminimide, percent |
|---|---|---|---|---|
| 9 | 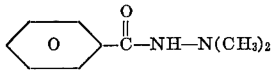 | Styrene oxide | 168 | 50 |
| 10 | Same as above | Cyclohexene oxide | 216 | 29 |
| 11 | do | 1,2-n-decylene oxide | 216 | 62 |
| 12 | 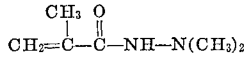 | 1,2-n-octadecylene oxide | 216 | 54 |
| 13 | Same as above | Cyclohexene oxide | 216 | 29 |
| 14 | do | Styrene oxide | 216 | 74 |
| 15 | do | 1,2-n-octadecylene oxide | 216 | 54 |

What is claimed is:

1. A process for the preparation of a tertiary amine mono-amide corresponding to the formula:

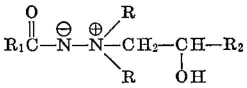

wherein $R_1$ represents alkyl, hydroxy alkyl, alkoxy, alkenyl, phenyl or cyanoalkyl; R is alkyl, and $R_2$ is hydrogen, alkyl, phenyl or hydroxy methyl; which comprises reacting at a temperature between about 40° and 80° C. stoichiometrical amounts of a hydrazide having the formula:

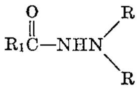

wherein $R_1$ and R have the above-indicated meanings; and an oxirane oxygen containing compound selected from the group consisting of styrene oxide, glycidol and a 1,2-alkylene oxide.

2. A process in accordance with Claim 1 wherein R is methyl.

3. A process in accordance with Claim 2 wherein $R_2$ is methyl.

4. A process in accordance with Claim 3 wherein $R_1$ is alkyl.

5. A process in accordance with Claim 3 wherein $R_1$ is phenyl.

6. A process in accordance with Claim 3 wherein $R_1$ is cyanoalkyl.

7. A process in accordance with Claim 3 wherein $R_1$ is alkenyl.

8. A process in accordance with Claim 7 wherein $R_1$ is $CH_2=C(CH_3)-$.

References Cited

UNITED STATES PATENTS

| | | | |
|---|---|---|---|
| 3,527,802 | 9/1970 | Slagel | 260—465.4 X |
| 3,485,806 | 12/1969 | Bloomquist et al. | 260—561 H X |
| 3,488,389 | 1/1970 | McKillip | 260—561 H |
| 3,499,032 | 3/1970 | Clemens et al. | 260—561 H |
| 3,410,880 | 11/1968 | Brocklehurst | 260—561 H |
| 2,899,424 | 8/1959 | Rudner | 260—558 H X |
| 2,953,570 | 9/1960 | Rudner | 260—561 H X |

FOREIGN PATENTS

| | | | |
|---|---|---|---|
| 1,903,207 | 8/1970 | Germany | 260—561 H |

OTHER REFERENCES

Perner, C. A.: Vol. 73 (1970), abstract 100292x.

JOSEPH P. BRUST, Primary Examiner

U.S. Cl. X.R.

260—465.4, 465 D, 471 C, 482 C, 558 H, 561 B, 561 H, 561 N, 562 H